United States Patent Office
3,062,795
Patented Nov. 6, 1962

3,062,795
PROCESS FOR PREPARING HALOGENATED COPOLYMERS
William P. Cain, Roselle, and Henry S. Makowski, Carteret, N.J., and Attilio L. Bisio, Jackson Heights, N.Y., assignors to Esso Research and Engineering Company, a corporation of Delaware
No Drawing. Filed Apr. 1, 1958, Ser. No. 725,513
4 Claims. (Cl. 260—88.2)

This invention relates to a process for preparing halogenated copolymers, and more particularly to the preparation of low pressure halogenated copolymers of ethylene and a higher alpha olefin.

The low pressure polymerization of alpha olefins and mixtures thereof with catalyst systems made up of reducible heavy transition metal compounds and a reducing metal containing compound is well known to the art; see e.g. Belgian Patent 533,362 "Chemical and Engineering News," April 8, 1957, pages 12 through 16, and "Petroleum Refiner," December 1956, pages 191 through 196. Also, the preparation of amorphous rubbery copolymers of ethylene and higher alpha olefins by the low pressure polymerization process is described in copending application 672,435, filed July 17, 1957.

It has now been found that halogenated amorphous rubbery copolymers of ethylene and higher alpha olefins which are suitable, when cured, as synthetic rubbers can be prepared by first copolymerizing ethylene and a higher alpha olefin in contact with a low pressure polymerization catalyst in an inert diluent, preferably inactivating or removing the polymerization catalyst, treating the polymerization mixture with a halogenating agent and isolating the resulting halogenated copolymer.

The low pressure polymerization catalysts useful for the present invention are those catalysts commonly used for the low pressure polymerization and copolymerization of alpha olefins, such as a catalyst system comprising a mixture of a reducing metal-containing material and a reducible heavy transition metal compound. This catalyst system can be prepared by mixing from about 0.2 to 12 parts of reducing metal-containing material per part of reducible heavy transition metal compound in an inert diluent, either by mixing the total quantities of these components together with or without pretreatment, or by using a staged reduction pretreat technique, i.e. by adding timed increments of the reducing metal-containing material to the total quantity of reducible heavy transition metal compound. Reducing metal-containing materials suitable for use as a catalyst component of this catalyst include the alkali and alkaline earth metals, their alloys, and their alkyl and/or aryl compounds; alkyl and aryl derivatives of other metals which have sufficient stability to permit reaction in their compound form with a reducible heavy metal compound, e.g. organo-aluminum compounds such as triisobutyl aluminum, tripropyl aluminum, triethyl aluminum, dialkyl aluminum halides such as diethyl aluminum halides and dimethyl aluminum halides, and methyl and ethyl aluminum dihalides. Organo-aluminum compounds with two hydrocarbon radicals or at least one hydrocarbon radical and one hydrogen and containing an electron attracting group such as an alkoxy, halogen, and organic nitrogen can be used. Mixtures of the above reducing metal-containing compounds can also be used such as mixtures containing ethyl aluminum dichloride and triethyl aluminum. The organo-aluminum compounds, especially trialkyl aluminum and dialkyl aluminum halide are preferred. All of the above compounds and the methods for their preparation are well known to the art. Reducible heavy metal compounds which can be used include inorganic compounds such as the halides, oxy-halides, complex halides, oxides, hydroxides, and organic compounds such as alcoholates, acetates, benzoates, and acetyl acetonates of the transition metals of the IV, V, VI, VII and VIII periods of the periodic system, and iron and copper, e.g. titanium, zirconium, hafnium, thorium, uranium, vanadium, niobium, tantalum, chromium, molybdenum, tungsten, and manganese. The metal halides, particularly the chlorides, are generally preferred. Titanium and zirconium are the preferred metal components since they are the most active of these metals. These catalysts are prepared by intimately mixing the reducing metal-containing material and the reducible heavy metal compound in an inert diluent and in a non-oxidizing atmosphere with stirring.

Preformed catalysts can also be used, and in fact are preferred in the present invention. These catalysts are activated partially reduced heavy transition metal compounds or activated partially reduced heavy transition metal compounds cocrystallized with a group II or III metal compound such as halides, e.g. aluminum chloride, boron trichloride, zinc chloride, and the like. The partially reduced heavy transition metal compounds include inorganic compounds such as the halides, oxyhalides, complex halides, oxides and hydroxides, and organic compounds such as alcoholates, acetates, benzoates, and acetonates of the transition metals of the IV, V, VI, VII and VIII groups of the periodic system, and iron and copper e.g. titanium, zirconium, hafnium, thorium, uranium, vanadium, niobium, tantalum, chromium, molybdenum, tungsten and manganese. The metal halides, particularly the chlorides, are generally preferred; especially purple crystalline titanium trichloride. Purple crystalline titanium trichloride cocrystallized with aluminum chloride is particularly preferred. When the catalyst is a partially reduced heavy transition metal compound cocrystallized with a group II or III metal compound, the catalyst contains from 0.05 to 1.0, preferably 0.1 to 0.5 mole of the group II or III metal compound per mole of partially reduced heavy transition metal compound. The partially reduced heavy transition metal compounds can be prepared by any procedure known to the art and the preparation of these compounds is not within the scope of the invention. However, some of the methods known for preparing the preferred preformed catalysts, i.e. purple crystalline titanium trichloride and purple crystalline titanium trichloride cocrystallized with aluminum chloride are summarized below.

(1) Reduction of titanium tetrachloride with aluminum powder in xylene at 100–175° C. at atmospheric pressure.
(2) Metal reduction of titanium tetrachloride with either aluminum powder, titanium powder, or mixtures of aluminum and titanium powder in the absence of solvent at elevated temperatures.
(3) Hydrogen reduction of titanium tetrachloride at temperatures above about 650° C.
(4) Reduction of titanium tetrachloride with metal alkyls, $AlEt_3$ in particular, in an inert diluent above about 150° C.
(5) Heating a mixture of titanium tetrachloride and an aluminum alkyl after the formation of a brown precipitate at a temperature above about 70° C. in the presence of an inert diluent.
(6) Reducing titanium tetrachloride with an aluminum trialkyl by carrying out the reduction in temperature graded stages in an inert diluent and with an aluminum trialkyl/$TiCl_4$ mole ratio of about 0.3/1.
(7) Heat reduction of titanium tetrachloride at temperatures above about 1000° C.

These catalysts are then activated with organo-metallic compounds, preferably organo-aluminum compounds, and especially aluminum alkyl compounds, such as alkyl aluminum halides and trialkyl aluminum, e.g. triethyl aluminum. Other organo-metallic compounds that can be used include dialkyl zinc, dialkyl magnesium, triaryl aluminum and complexes such as lithium aluminum trialkyl. In general, from 0.1 to 5.0 moles of the activating organo-metallic compound per mole of partially reduced transition metal halide is added to the catalyst in an inert diluent.

The inert diluents that are employed in the present process are aliphatic and aromatic hydrocarbons. Halogenated aromatic hydrocarbons can also be used. Examples of useful diluents are n-hexane, n-heptane, n-decane, benzene, chlorobenzene, dichlorobenzenes, and the like. The aromatic hydrocarbons are the preferred diluents for use with the preformed catalysts, which are the preferred catalysts for the present process. Aromatic diluents such as toluene, xylenes, and aromatic compounds having active benzylic hydrogen atoms are not preferred since they react with the halogenating agents. Aromatic diluents which poison the catalysts such as nitrobenzenes, anilines, and phenols cannot be used. Additionally, the inert diluents used herein should be free of catalyst poisons such as oxygen, carbon monoxide, sulfur, and water.

The copolymerization of ethylene and a higher alpha olefin is carried out in an inert aromatic diluent with from 15 to 85 mol. percent, preferably 40 to 60 mol. percent of ethylene with 85 to 15 mol. percent, preferably 60 to 40 mol. percent of an alpha olefin containing from 3 to 6 carbon atoms at pressures ranging from atmospheric to 15 atmospheres with a catalyst concentration of 0.1 to 5 g./l., preferably 1 g./l. The polymerization temperature is not critical although temperatures in the range of 0° to 110° C., preferably 30° to 80° C., are generally used. The polymerization is permitted to proceed until the concentration of copolymer in the inert diluent is from about 50 to 180 g./l.

The polymerization reaction mixture is then utilized for the halogenating step without isolating the copolymer contained therein. Unreacted olefins can be purged prior to chlorination by passing an inert gas such as nitrogen through the reaction mixture. It is then highly preferred that the catalyst be inactivated or physically removed. The halogenation step can be carried out without inactivating or removing the catalyst but in general low halogenation reaction rates, smaller quantities of halogen in the copolymer, and a gelled halogenation reaction product result. Accordingly, while the carrying out of the process of the invention without inactivating or physically removing the catalyst is within the broader scope of the invention, it is not equivalent to the preferred process. The catalyst can be removed by treating the reaction mixture with about an equal volume of water with stirring, allowing the resulting mixture to settle into a water layer and an inert aromatic solvent layer, and removing the water layer. This water treatment is repeated until a large part of the polymerization catalyst is removed from the reaction mixture. This occurs since each water layer contains a major proporiton of the catalyst remaining in the reaction mixture. Alternatively and preferably, a catalyst inactivator can be added to the reaction mixture in amounts ranging from 1 to 30 times the amount necessary for inactivation. The inactivated catalyst is thereafter allowed to remain in the reaction mixture. The catalyst inactivator can be chosen with a boiling point below the chlorination temperature to allow for easy removal, although removal of excess catalyst inactivator is usually unnecessary. The catalyst inactivator can be a compound containing an OH group, such as steam, water and lower aliphatic alcohols having from 1 to 5 carbon atoms per molecule, preferably methanol, or a chelating agent, such as ketones and 2,3- and 2,4-diketones. Water and steam are preferred. A mixture of any of the above catalyst inactivators can also be used. When the term "inactivate" is used henceforth in the specification and claims it is to be understood to include physical removal.

The halogenation reaction is carried out by treating the polymerization reaction mixture with a halogenating agent such as chlorine, bromine, iodine, fluorine, dichloro dimethylhydantoin, N-bromosuccinimide, and the like, with chlorine preferred. Halogenation conditions can be varied widely and are not critical. In general temperatures of from 0° C. to 150° C. can be used, depending on the activity of the halogenating agent employed. When chlorine is used as the halogenating agent temperatures of from 40° to 150° C., preferably 70° to 120° C. and a reaction time of from about one minute to one hour is utilized. Pressures of from atmospheric to 25 atmospheres are employed. However, pressures above atmospheric are required only when the desired halogenation temperature exceeds the boiling point of the solution at atmospheric pressure. The halogenation reaction can also be carried out in the presence of ultraviolet light which will accelerate the rate of reaction and thus require lower temperatures and result in better halogen utilization. In general, the quantity of halogenating agent is chosen to produce 2 to 10 times the amount of halogen that reacts with the copolymer, the latter amount being sufficient to provide halogenated copolymers having from 0.5 to 40 wt. percent, preferably 3 to 10 wt. percent halogen therein. Halogenated copolymers containing quantities of halogen outside these limits can also be obtained by the process of the invention, and although not as useful, their preparation is within the scope of the invention.

The halogenated copolymer is isolated from the halogenation reaction mixture by one of three techniques: (1) by the addition of an alcohol or a ketone to the reaction mixture to precipitate the halogenated copolymer, (2) by the addition of a chelating agent and an alcohol to the reaction mixture, and (3) by washing the reaction mixture with water followed by removal of most of the diluent by steam stripping. When isolation technique (1) or (2) is used, the precipitated halogenated copolymer is filtered from the liquid portion and dried. When technique (1) is used the alcohol is an aliphatic alcohol having from 1 to 4 carbon atoms per molecule, preferably methanol, and the ketone contains from 3 to 8 carbon atoms per molecule, preferably acetone. From 0.5 to 5, preferably from 1 to 2 volumes of alcohol or ketone is added, based on the volume of the halogenation reaction mixture. However, this technique results in most of the catalyst residues remaining in the halogenated copolymer unless they were previously removed prior to the halogenation step. If it is desired to obtain halogenated copolymers free of catalyst residues, technique (2) is used. A small quantity, i.e. from 1 to 3 moles per mole of catalyst, of a chelating agent such as acetyl acetone is added to solubilize the catalyst residues and eliminate them from the precipitated halogenated copolymer. The same quantity of alcohol as in technique (1) is used with the chelating agent to precipitate the halogenated copolymer. Technique (3) has economic and operating advantages over techniques (1) and (2) in that only water is used to isolate the halogenated copolymer. This technique involves first washing the halogenation reaction mixture with a large volume of water, e.g. from 1 to 5 volumes based on the volume of the reaction mixture. The inert aromatic diluent is then steam stripped off, leaving the halogenated copolymer as a slurry in water, which is then filtered and dried in conventional drying equipment such as tunnel driers, tray driers, and degassing dewatering extruders.

The isolated hologenated copolymers can then be cured with conventional curing agents such as sulfur-zinc oxide mixtures to form synthetic rubbers having good to excellent mechanical, dynamic and chemical properties. In addition to the curing agent, fillers such as carbon blacks, silica, mica and the like can also be incorporated in the mixture. From 5 to 100 parts preferably 30 to 60 parts of filler per 100 parts of halogenated copolymer is used. The curing reaction is carried out by mixing the halogenated copolymer, the curing agent and the filler if any, on a rubber mill and heating the mixture to reaction temperature. The mixing can also be carried out in other rubber compounding equipment such as Banbury mixers or kneaders.

The reaction will be better understood by reference to the following examples.

EXAMPLE I

A copolymerization catalyst was prepared by first forming a $TiCl_3 \cdot 0.2\ AlCl_3$ catalyst by reducing $TiCl_4$ with Al powder. The $TiCl_3 \cdot 0.2\ AlCl_3$ catalyst was then slurried in sufficient chlorobenzene to obtain a catalyst concentration of 10 grams per liter and a sufficient quantity of $AlEt_3$ added thereto at 25° C. to give an $AlEt_3/TiCl_3$ mol ratio of 1.34. Additional chlorobenzene was then added to give a catalyst concentration of 0.84 gram per liter, with a total of 2.51 grams of catalyst in 3 liters of chlorobenzene. A 50 vol. percent ethylene–50 vol. percent propylene gaseous feed was then introduced into the chlorobenzene at about 70° C. for 30 minutes to produce an ethylene-propylene copolymer solution. Then 20 milliliters of methanol was added to inactivate the catalyst. The resulting mixture was then heated to 115° C., nitrogen passed through to remove unreacted olefins, and chlorine gas at a rate of 1100 cc. per minute at atmospheric pressure was passed into the solution for 15 minutes. Thereafter the mixture was cooled, nitrogen again passed through, and 3 liters of acetone added to the mixture to precipitate the chlorinated copolymer from the solution. The precipitated copolymer was then kneaded with additional acetone, banded on a hot rubber mill to remove excess chlorobenzene and acetone, compacted, and dried. 114 grams of chlorinated copolymer was obtained with the properties shown in Table I.

EXAMPLES II THROUGH IV

The preparation of an ethylene-propylene copolymer was carried out with the same quantities of ingredients and reaction conditions given in Example I except that in Example IV the copolymerization reaction time was 60 minutes. However, different methods of catalyst treatment prior to the chlorination reaction were undertaken in these examples. The particular catalyst treatment method used, the yield of chlorinated copolymer obtained and the properties of these copolymers are given in Table I.

EXAMPLE V

The preparation of an ethylene-propylene copolymer was carried out with the same quantities of ingredients and reaction conditions given in Example I except that the catalyst was removed from the polymerization reaction mixture instead of being inactivated as in Example I. The catalyst was removed by washing the polymerization reaction mixture twice, each time with 8 l. of water. The washed reaction mixture was then treated with chlorine as in Example I. The chlorination reaction conditions and the yield and properties of the chlorinated copolymer obtained are given in Table I.

EXAMPLE VI

A chlorinated copolymer was prepared according to the process of Example IV except that the chlorination reaction mixture was washed twice at 50° C., each time with a volume of water twice the volume of the reaction mixture. The chlorobenzene was then removed from the resulting mixture by steam distillation. The chlorinated copolymer-water mixture remaining was then filtered, and the chlorinated copolymer dried at 60° C. for 18 hours. The properties of the chlorinated copolymer are given in Table I.

EXAMPLES VII THROUGH X

Halogenated ethylene-propylene copolymers were prepared by the process of Example I. The reaction components, conditions, and the properties of the halogenated copolymers prepared are given in Table I. In Examples VIII and IX ultraviolet light was used during the halogenation step.

*Table I*

| | Ex. I | Ex. II | Ex. III | Ex. IV | Ex. V | Ex. VI | Ex. VII | Ex. VIII | Ex. IX | Ex. X |
|---|---|---|---|---|---|---|---|---|---|---|
| Diluent | (1) | (1) | (1) | (1) | (1) | (1) | (2) | (3) | (4) | (1) |
| Catalyst | (5) | (5) | (5) | (5) | (5) | (5) | (5) | (5) | (5) | (5) |
| Copolymerization: | | | | | | | | | | |
| Catalyst conc. g./l | 0.84 | 0.84 | 0.84 | 0.84 | 0.84 | 0.84 | 0.84 | 0.84 | 0.84 | 0.84 |
| Volume, l | 3 | 3 | 3 | 3 | 3 | 3 | 3 | 3 | 3 | 3 |
| Vol. percent ethylene–vol. percent propylene feed | 50-50 | 50-50 | 50-50 | 50-50 | 50-50 | 50-50 | 50-50 | 50-50 | 50-50 | 50-50 |
| Temperature, °C | 70 | 70 | 70 | 70 | 70 | 70 | 70 | 70 | 70 | 70 |
| Time, minutes | 30 | 30 | 30 | 60 | 30 | 60 | 45 | 60 | 60 | 60 |
| Catalyst efficiency, g./g | 46 | 48 | 35 | 51 | 47 | 51 | | | | |
| Catalyst Treatment: | | | | | | | | | | |
| $CH_3OH$, ml | 20 | 0 | | | | | | | | 30 |
| $H_2O$, ml | | 0 | 20 | 400 | | 400 | 27 | 30 | 30 | |
| Removal, water washes, total volume ml | | 0 | | | 16000 | | | | | |
| Halogenation: | | | | | | | | | | |
| Halogen used | $Cl_2$ | $Cl_2$ | $Cl_2$ | $Cl_2$ | $Cl_2$ | $Cl_2$ | $Cl_2$ | $Br_2$ | $Br_2$ | $Br_2$ |
| Halogen, g | 50 | 50 | 50 | 50 | 50 | 50 | 66 | 43 | 43 | 22 |
| Temperature, °C | 115 | 115 | 115 | 115 | 115 | 115 | 115 | 80 | 75 | 108 |
| Time, minutes | 15 | 15 | 15 | 15 | 15 | 15 | 20 | 20 | 15 | 27 |
| Yield, g | 114 | 120 | 88 | 129 | 118 | 129 | 182 | 226 | 248 | 226 |
| Properties of halogenated copolymers: | | | | | | | | | | |
| Inherent viscosity, $\eta^i$ | 1.48 | 6 >0.515 | 1.33 | 0.70 | 1.60 | 1.25 | 1.08 | 1.29 | 0.714 | 1.43 |
| Molecular weight Harris x $10^{-3}$ | 67 | >12.5 | 56 | 20 | 75 | 51 | 40 | 54 | 22 | 66 |
| Percent gel | 13.6 | 69.7 | 15.8 | 8.9 | 13.0 | 29.1 | 20.2 | 21.8 | 49.3 | 25.7 |
| Dry ash, weight percent | 0.234 | 0.801 | 0.739 | 0.519 | 0.250 | 0.974 | | | | |
| Halogen, weight percent | 13.3 | 6.4 | 14.3 | 16.0 | 11.3 | 11.7 | 8.01 | 6.95 | 5.29 | 2.27 |

¹ Chlorobenzene.   ² o=Dichlorobenzene.   ³ A mixture of benzene, o-dichlorobenzene and chlorobenzene.   ⁴ Benzene.   ⁵ $AlEt_3 = TiCl_3 \cdot 0.2\ AlCl_3$.   ⁶ Incompletely soluble in tetralin.

It can be seen from the above examples that halogenated amorphous copolymers of ethylene and higher alpha olefins can be prepared without isolating the intermediate copolymer formed from the polymerization reaction. It is to be noted that the chlorination process of Example II wherein no catalyst inactivation or removal is employed results in a low chlorination rate, very high percentage of gel, and a relatively small percentage of chlorine in the copolymer as compared to the chlorination processes of Examples I and III through VII which employ either catalyst inactivation or removal.

The advantages of the process of the invention are apparent since expensive and time consuming copolymer isolation techniques are not necessary prior to the halogenation step.

The following examples show the excellent properties obtained for the halogenated copolymers of the invention when cured with conventional curing mixtures containing sulfur and zinc oxide.

EXAMPLES XI AND XII

The chlorinated copolymers of Examples VI and IV were used in the curing mixtures of Examples XI and XII respectively. The following curing mixture was used.

| Component: | Parts by weight |
|---|---|
| Chlorinated copolymer | 100 |
| Semi-reinforcing carbon black | 50 |
| ZnO | 5 |
| Sulfur | 2 |
| Tetramethylthiuram disulfide | 1 |
| Benzothiazyl disulfide | 1 |

A control was also heated to curing temperatures for comparison purposes.

CONTROL

| Component: | Parts by weight |
|---|---|
| Chlorinated copolymer | 100 |
| Semi-reinforcing carbon black | 50 |

The curing conditions and the properties of the cured copolymers and the controls are given in Table II.

*Table II*

| | Example XI | | Example XII | |
|---|---|---|---|---|
| | Tensile strength, p.s.i. | Elongation, percent | Tensile Strength, p.s.i. | Elongation, percent |
| Control: | | | | |
| 8'/309° F | 710 | 570 | 720 | 780 |
| 15'/309° F | 850 | 460 | 1,220 | 570 |
| 40'/309° F | 1,090 | 380 | 1,930 | 360 |
| Curing mixture: | | | | |
| 8'/309° F | 2,290 | 140 | 2,340 | 130 |
| 15'/309° F | 2,290 | 110 | 2,200 | 110 |
| 40'/309° F | 2,140 | 90 | 1,520 | 90 |

In addition to the excellent tensile strength properties of the cured copolymers, they also exhibited snappy, rubbery characteristics. These cured copolymers are useful as synthetic rubbers for use in tires, gaskets, hoses and the like.

Variations in the process for forming the halogenated copolymers of the invention can be made without departing from the scope and spirit of the invention.

What is claimed is:

1. A process for preparing a halogenated copolymer of ethylene and propylene which comprises: (1) polymerizing said ethylene and propylene in an inert diluent at a temperature between 0 and 110° C. in the presence of a low pressure polymerization catalyst comprising a partially reduced heavy transition metal compound activated with an alkyl aluminum compound to form a polymerization reaction mixture; (2) inactivating said catalyst in said polymerization reaction mixture; and (3) treating said reaction mixture at a temperature between 0 and 150° C. with a halogenating agent selected from the group consisting of chlorinating agents and brominating agents to produce a halogenated copolymer.

2. The process of claim 1 wherein the catalyst is inactivated by incorporating within the reaction mixture a compound containing an OH group selected from the group consisting of steam, water, a lower aliphatic alcohol having from 1 to 5 carbon atoms per molecule, a ketone and a diketone.

3. The process of claim 2 wherein the inert diluent comprises chlorobenzene.

4. The process of claim 1 wherein the polymerization catalyst comprises $TiCl_3 \cdot AlCl_3$ activated with trialkyl aluminum.

References Cited in the file of this patent

UNITED STATES PATENTS

| 2,200,429 | Perrin et al. | May 14, 1940 |
| 2,405,971 | McAlevy | Aug. 20, 1946 |
| 2,691,647 | Field et al. | Oct. 12, 1954 |
| 2,824,089 | Peters et al. | Feb. 18, 1958 |
| 2,849,431 | Baxter | Aug. 26, 1958 |
| 2,850,490 | Canterino et al. | Sept. 2, 1958 |
| 2,886,561 | Reynolds et al. | May 12, 1959 |
| 2,890,213 | Noeske | June 9, 1959 |
| 2,906,743 | Heitzer et al. | Sept. 29, 1959 |
| 2,920,064 | Baptist et al. | Jan. 5, 1960 |

FOREIGN PATENTS

| 526,101 | Italy | May 14, 1955 |
| 538,782 | Belgium | Dec. 6, 1955 |